US012097826B2

(12) United States Patent
Gimeno Ferrer

(10) Patent No.: US 12,097,826 B2
(45) Date of Patent: Sep. 24, 2024

(54) SYSTEMS AND METHODS TO WASH A VEHICLE IN A CAR WASH

(71) Applicant: Ford Global Technologies, LLC, Dearborn, MI (US)

(72) Inventor: Daniel Gimeno Ferrer, Valencia (ES)

(73) Assignee: Ford Global Technologies, LLC, Dearborn, MI (US)

( * ) Notice: Subject to any disclaimer, the term of this patent is extended or adjusted under 35 U.S.C. 154(b) by 634 days.

(21) Appl. No.: 17/171,080

(22) Filed: Feb. 9, 2021

(65) Prior Publication Data

US 2022/0250590 A1 Aug. 11, 2022

(51) Int. Cl.
*B60S 3/04* (2006.01)
*G01C 21/34* (2006.01)
*G05B 15/02* (2006.01)
*G05D 1/00* (2006.01)
*G07C 5/08* (2006.01)

(52) U.S. Cl.
CPC ............ *B60S 3/04* (2013.01); *G01C 21/3476* (2013.01); *G05B 15/02* (2013.01); *G05D 1/0212* (2013.01); *G07C 5/0808* (2013.01)

(58) Field of Classification Search
None
See application file for complete search history.

(56) References Cited

U.S. PATENT DOCUMENTS 3,679,134 A * 7/1972 Nixon ................... B60S 3/042
239/70
2012/0253973 A1 10/2012 Harter 2017/0313288 A1* 11/2017 Tippy ..................... H04N 23/55
2018/0341270 A1* 11/2018 Dudar ........................ G06T 7/90
2018/0364728 A1* 12/2018 Yaldo ..................... G06Q 10/20
2019/0250259 A1* 8/2019 Frieventh Cienfuegos ................
G01S 7/4811

(Continued)

FOREIGN PATENT DOCUMENTS

CN 103909909 * 7/2014
CN 111422166 * 7/2020

(Continued)

OTHER PUBLICATIONS

Translation of CN103909909 by Wu, published Jul. 9, 2014.*

(Continued)

*Primary Examiner* — Mikhail Kornakov
*Assistant Examiner* — Ryan L Coleman
(74) *Attorney, Agent, or Firm* — Emily Drake; Eversheds Sutherland (US) LLP

(57) ABSTRACT

This disclosure is generally directed to systems and methods related to washing a vehicle in a car wash. In an example method, a car wash controller in a car wash detects a vehicle inside a bay of the car wash and selects a piece of equipment for washing a certain portion of the vehicle. Selecting the equipment may be based on an amount of dirt present on the portion of the vehicle, which can be, for example, a front portion, a rear portion, a side portion, a roof, or an underbody of the vehicle. The car wash controller may query a driver of the vehicle to determine a detergent preference. A car wash system computer in the vehicle may specify an amount of water to be used for washing the vehicle. The car wash controller washes the portion of the car using the detergent and the specified amount of water.

7 Claims, 4 Drawing Sheets

(56) References Cited

U.S. PATENT DOCUMENTS

2020/0142363 A1\* 5/2020 Ray .................... G05B 13/0285
2020/0406866 A1\* 12/2020 Asai .......................... B60S 3/00
2022/0212635 A1\* 7/2022 Kurzhals .......... G06Q 10/06311

FOREIGN PATENT DOCUMENTS

| DE | 102007058799 A1 | | 6/2009 |
|---|---|---|---|
| DE | 102017115345 | \* | 1/2019 |
| DE | 102018220306 | \* | 5/2020 |
| WO | 2019095135 A1 | | 5/2019 |
| WO | WO2020151188 | \* | 7/2020 |

OTHER PUBLICATIONS

Translation of CN111422166 by Jin, published Jul. 17, 2020.\*
Translation of WO2020151188 by Liu, published Jul. 30, 2020.\*
Translation of DE102018220306 by Albl, published May 28, 2020.\*
Translation of DE102017115345 by Mayer, published Jan. 10, 2019.\*
Banner, "Vehicle Detection At A Car Wash", Car Wash Vehicle Detection Solutions, Feb. 1, 2020, 10 pages, Banner Engineering Corp., Minneapolis, MN.

\* cited by examiner

SYSTEMS AND METHODS TO WASH A VEHICLE IN A CAR WASH

BACKGROUND

A vehicle owner may opt to wash his/her vehicle in various ways, such as, for example, by washing the vehicle in a driveway of his/her residence or by driving the vehicle through a car wash. Washing the vehicle in a driveway offers the vehicle owner some level of control over the cleaning operation, such as, for example, an ability to visually identify certain areas of the vehicle that require extra attention and certain parts of the vehicle that need cleaning to be carried out in a certain way. For example, residue from brake pads may have accumulated on a front pair of wheels of the vehicle. The owner may decide to use a first type of detergent to remove this type of dust from the wheels and to use a different type of detergent to remove mud from the body of the vehicle. As another example, the owner may apply more water upon certain parts of the vehicle (such as the grille and the lights of the vehicle) and less water upon some other parts (such as the roof the vehicle).

In some situations, such as, for example, when the vehicle owner lives in an apartment and/or is pressed for time, the vehicle owner may opt to run his/her vehicle through a car wash. A typical car wash may provide a set of options that are based on a graded pricing schedule. For example, a basic wash cycle may be provided at a first price, a multiple wash cycle at a second price, an underbody wash and/or a wheel wash at a third price, a wax application for a fourth price, a drying operation for a fifth price, and so on. However, the set of options do not typically include certain options such as, for example, a way to allow the vehicle owner to specify the use of a limited amount of water for the wash.

It is therefore desirable to provide solutions that address at least some shortcomings in conventional procedures for washing a vehicle in a car wash.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
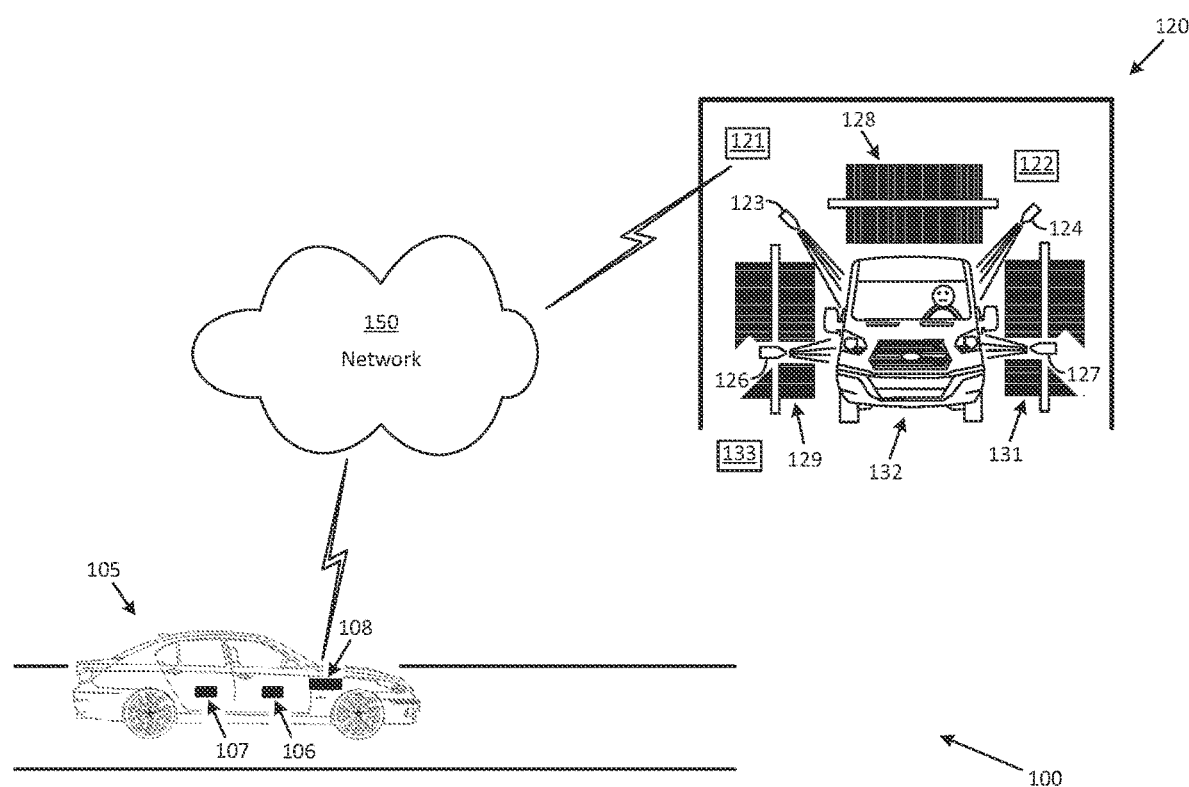
FIG. 1 shows an example system to facilitate washing a vehicle in a car wash in accordance with an embodiment of the disclosure.

In terms of a general overview, certain embodiments described in this disclosure are directed to systems and methods related to washing a vehicle in a car wash. In an example method in accordance with the disclosure, a car wash controller in a car wash detects a vehicle inside a bay of the car wash. The car wash controller then selects a first piece of equipment in the car wash for washing a first portion of the vehicle such as, for example, a front portion of the vehicle, a rear portion of the vehicle, a side portion of the vehicle, a roof of the vehicle, or an underbody of the vehicle. Selecting the first piece of equipment may be based on an amount of dirt present on the first portion of the vehicle. The car wash controller may query a driver of the vehicle to determine a choice of detergent to be used for the wash, such as, for example, an eco-friendly detergent. A car wash system computer in the vehicle may provide instructions to the car wash controller in the car wash that specify an amount of water to be used for washing the vehicle. The car wash controller operates the first piece of equipment accordingly to wash the first portion of the vehicle.

In another example method in accordance with the disclosure, a dirt detection system of a vehicle detects an amount of dirt present on the vehicle. In one scenario, the surface area over which the dirt is detected by the dirt detection system may extend over an entire external surface of the vehicle. In another scenario, the surface area over which the dirt is detected by the dirt detection system may be limited to certain parts of the external surface of the vehicle, such as, for example, a front portion of the vehicle, a rear portion of the vehicle, a side portion of the vehicle, a roof of the vehicle, or an underbody of the vehicle.

A car wash system computer in the vehicle may evaluate the information provided by the dirt detection system and determine that the amount of dirt present on the vehicle exceeds a threshold value. When the amount of dirt exceeds the threshold value, the car wash system computer may execute a remedial action directed at having the vehicle washed. One example of a remedial action involves the car wash system computer communicating with an infotainment system in the vehicle to issue an announcement that the vehicle is in need of a wash and/or providing navigation guidance to a driver of the vehicle to drive to a car wash. Another example of a remedial action, where the vehicle is an autonomous vehicle, involves the car wash system computer locating a car wash and determining a travel path for the autonomous vehicle to travel to the car wash.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "information" and "data" may be used interchangeably and must be understood to be equivalent in the context of the disclosure. The word "dirt" as used herein is intended to encompass all kinds of undesirable deposits upon a vehicle. The deposits may be natural and/or man-made, such as, for example, dust, mud, grime, bird droppings, pollen, and graffiti. The phrase "car wash" as used herein is intended to encompass various types of structures for washing various types of vehicles (trucks, vans, buses, etc.) and is not limited solely to cars. It should also be understood that the word "example" as used herein is intended to be non-exclusionary and non-limiting in nature.

FIG. 1 shows an example system 100 to facilitate washing a vehicle 105 in a car wash 120 in accordance with an embodiment of the disclosure. The vehicle 105 may be any of various types of vehicles such as, for example, a car, a van, a sports utility vehicle, a truck, an electric vehicle, a gasoline vehicle, a hybrid vehicle, an autonomous vehicle, a boat, an airplane, or a train. The vehicle 105 may include components such as a vehicle computer 106, a dirt detection system 107, and a car wash system computer 108. The components, which are symbolically depicted as black boxes in FIG. 1, may be installed at various locations inside or outside the vehicle 105, such as, for example, an engine compartment, a glove compartment, a trunk, a console inside the cabin area, a door panel, or a chassis member (inside or outside the vehicle). The vehicle 105 may further include other components (not shown) such as, for example, an infotainment system and a wireless communication system.

The vehicle computer 106 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle computer 106 may include more than one computer such as, for example, a first computer that controls engine operations and a second computer that operates the infotainment system.

The car wash system computer 108 is configured to execute various operations in accordance with the disclosure. Such operations may include wirelessly communicating with various systems and devices via a network 150. The network 150 may include any one, or a combination of networks, such as a local area network (LAN), a wide area network (WAN), a telephone network, a cellular network, a cable network, a wireless network, and/or private/public networks such as the Internet. For example, the network 150 may support communication technologies such as Bluetooth®, cellular, near-field communication (NFC), Wi-Fi, Wi-Fi direct, vehicle-to-vehicle (V2V) communication, vehicle-to-everything (V2X) communication, machine-to-machine communication, and/or man-to-machine communication. At least one portion of the network 150 includes a wireless communication link that allows the car wash system computer 108 to communicate with the car wash controller 121 located in the car wash 120 and/or to communicate with other devices located in other car washes.

The dirt detection system 107 may be implemented in any of various ways. In one example implementation, the dirt detection system 107 can include multiple cameras that are mounted at various locations upon the vehicle 105 in order to capture images of various exterior surfaces of the vehicle 105. The images may be provided to the car wash system computer 108, which may evaluate the images for determining the amount of dirt present on one or more of the various exterior surfaces of the vehicle 105.

In another example implementation, the dirt detection system 107 may include a set of photodiode sensors and one or more photodiode transmitters. The set of photodiode sensors are mounted on a reflective exterior surface of the vehicle 105 and are spaced apart from each other. A transparent layer is provided on top of the reflective exterior surface and substantially parallel to the reflective exterior surface. The photodiode transmitter(s) is mounted on the reflective exterior surface (or between the reflective exterior surface and the transparent layer) in such a manner as to direct light outwards through the transparent layer. The photodiode sensors detect an amount of light that may be reflected by the transparent layer back towards the reflective exterior surface as a result of dirt when present on the transparent layer. The amount of reflected light provides an indication about the amount of dirt that is present on the transparent layer (more reflected light more dirt, and vice-versa). Further details about this arrangement and methods of implementation are provided in United States Publication Number 20180250259 A1 published on Aug. 15, 2019 and titled "Surface Dirtiness Detection," which is hereby incorporated in its entirety as if fully set forth herein.

The car wash 120 includes the car wash controller 121 and other components such as, for example, a sensor system 122 and a dirt detection system 133. The car wash 120 also includes equipment for washing various vehicles (such as, for example, a vehicle 132 that has moved into a bay of the car wash 120). The equipment may include a set of roller brushes, such as, for example, a roller brush 128 that cleans a roof portion of the vehicle 132, a roller brush 131 that cleans a driver side portion of the vehicle 132, and a roller brush 129 that cleans a passenger side portion of the vehicle 132. Other brushes and cleaning gear may be provided to specifically clean some other parts of the vehicle 132 such as, for example, the wheels of the vehicle 132, the underbody of the vehicle 132, and the grille of the vehicle 132.

The equipment in the car wash 120 further includes various nozzles for spraying water upon the vehicle 132 and for dispensing materials such as a detergent and/or liquid wax. The example nozzles include a nozzle 124 that directs water and/or detergent upon a driver side portion of the vehicle 132, a nozzle 123 that directs water and/or detergent upon a passenger side portion of the vehicle 132, a nozzle 127 that directs water and/or detergent upon wheels on a driver side of the vehicle 132, and a nozzle 126 that directs water and/or detergent upon wheels on a passenger side of the vehicle 132. It must be understood that each illustrated nozzle typically represents a number of nozzles. For example, the nozzle 124 represents a set of nozzles that may be mounted on a vertical bar that moves back and forth along the driver side of the vehicle 132 in order to spray water (and/or detergent) on the entire driver side portion of the vehicle 132.

In an example embodiment in accordance with the disclosure, the dirt detection system 107 of the vehicle 105 may detect an amount of dirt present on the vehicle 105. The dirt detection procedure may be carried out at any of various times, such as, for example, at a preselected time when the vehicle 105 is parked in a garage, a driveway, a road, etc. In an example scenario, the preselected time may be determined by an owner of the vehicle 105 (for example, 7 AM before setting off to work, noon during lunch break, 7 PM after returning from work, etc.) and provided as information to the car wash system computer 108. In another example scenario, the preselected time may be programmed into the car wash system computer 108 by a manufacturer of the vehicle 105 or a car dealership. In yet another example scenario, the dirt detection procedure may be initiated by a driver of the vehicle 105 at an arbitrary time such as, when the driver notices that the vehicle 105 appears dirty.

In one example situation, the surface area over which the dirt is detected by the dirt detection system 107 may extend over an entire external surface of the vehicle 105. In another example situation, the surface area over which the dirt is detected by the dirt detection system 107 may be limited to certain parts of the external surface of the vehicle 105, such as, for example, a front portion of the vehicle 105, a rear portion of the vehicle 105, a side portion of the vehicle 105, a roof of the vehicle 105, or an underbody of the vehicle 105.

The car wash system computer 108 may evaluate the information provided by the dirt detection system 107 and determine that the amount of dirt present on the vehicle 105 exceeds a threshold value. The threshold value may be defined by any of various entities, such as, for example, an owner of the vehicle 105. The threshold value defined by the owner of the vehicle 105 may be different than a threshold value defined by an owner of a different vehicle because each individual may define dirtiness based on personal considerations. The threshold value may also vary from time to time. For example, the owner of the vehicle 105 may accept a certain level of dirt on the vehicle 105 during a weekday (dirt accumulated as a result of a daily work commute) but may find the same level of dirt unacceptable during the weekend when using the vehicle 105 to attend a social event.

The car wash system computer 108 may execute a remedial action directed at having the vehicle washed upon determining that the amount of dirt exceeds the threshold value. One example of a remedial action involves the car wash system computer 108 communicating with an infotainment system in the vehicle 105 to issue an announcement that the vehicle 105 is in need of a wash. In some cases, the car wash system computer 108 may cooperate with a GPS system in the vehicle 105 to locate a car wash, which may be any car wash that is closest to the vehicle 105 at the time when remedial action is initiated, or may be a specific car wash (such as a car wash that is preferred by an owner of the vehicle 105). The car wash system computer 108 may then provide navigation assistance to the driver of the vehicle 105 to travel to the car wash. When the vehicle 105 is an autonomous vehicle, the car wash system computer 108 may cooperate with the vehicle computer 106 to autonomously drive the vehicle 105 to the car wash.

In an example embodiment, the car wash system computer 108 may communicate with the car wash controller 121 via the network 150 for various purposes, such as, for example, to place a reservation ahead of time before the vehicle 105 reaches the car wash 120. Placing the reservation may include the driver of the vehicle 105 selecting a preferred time and a preferred type of wash to be performed upon the vehicle 105.

An example washing procedure at the car wash 120 is described below with reference to another figure.

Figure 2:
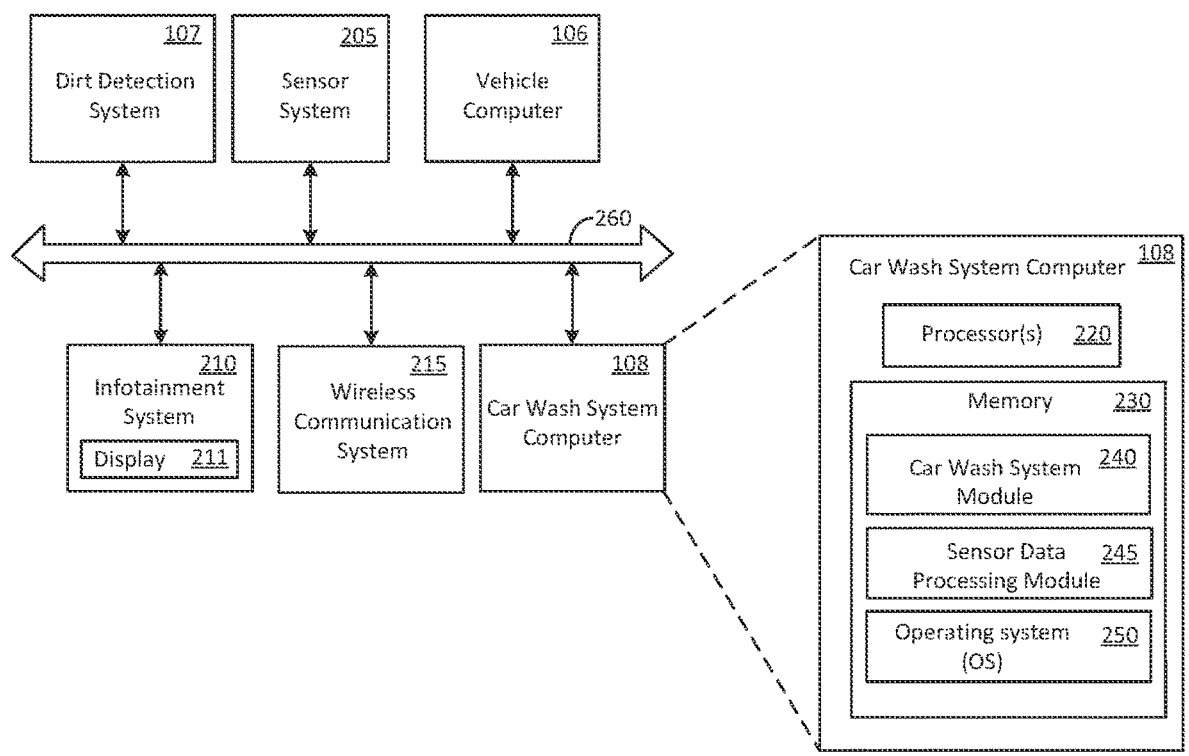
FIG. 2 shows some example components that may be included in a vehicle in accordance with the disclosure.

FIG. 2 shows some example components that may be included in the vehicle 105 in accordance with the disclosure. In this example configuration, the vehicle 105 may include the dirt detection system 107, the car wash system computer 108, the vehicle computer 106, a sensor system 205, an infotainment system 210, and a wireless communication system 215 that are communicatively coupled to each other via a bus 260.

The bus 260 can be implemented using one or more of various wired and/or wireless technologies. For example, the bus can be a vehicle bus that uses a controller area network (CAN) bus protocol, a Media Oriented Systems Transport (MOST) bus protocol, and/or a CAN flexible data (CAN-FD) bus protocol. Some or all portions of the bus may also be implemented using wireless technologies such as Bluetooth®, ZigBee®, or near-field-communications (NFC), cellular, Wi-Fi, Wi-Fi direct, vehicle-to-vehicle (V2V) communication, vehicle-to-everything (V2X) communication, machine-to-machine communication, and/or man-to-machine communication to accommodate communications between the car wash system computer 108 and various devices such as, for example, the infotainment system 210 and/or one or more sensors of the sensor system 205.

The bidirectional links between the various elements can carry commands in one direction (such as, for example, a "fetch information" command issued by the car wash system computer 108 to the dirt detection system 107) and can carry information in an opposite direction (such as, for example, images and/or information from the dirt detection system 107 to the car wash system computer 108).

The dirt detection system 107 may include various types of components based on the nature of the detection process. For example, in one implementation, the dirt detection system 107 may include one or more cameras that capture images of various exterior surface areas of the vehicle 105 and provide the images to the car wash system computer 108 for evaluating. In another implementation, the dirt detection system 107 may incorporate photodiode sensors and photodiode transmitters in an arrangement (described above) for detecting an amount of dirt that may be present on various exterior surface areas of the vehicle 105.

The sensor system 205 may include various types of sensors for performing various types of functions. A few examples of such sensors may include cameras, infrared sensors, radar sensors, and ultrasonic sensors. One or more of these sensors may be arranged to provide information to the car wash system computer 108 to allow the car wash system computer 108 to determine a location of the vehicle 105 at various times. In an example embodiment in accordance with the disclosure, a sensor in the form of a camera may provide one or more images to the car wash system computer 108. The car wash system computer 108 may evaluate the image(s) to detect that the vehicle 105 is inside a bay of the car wash 120.

The wireless communication system 215 may include elements such as wireless transmitters and receivers that enable communicative coupling between the car wash system computer 108 and the network 150.

The infotainment system 210 can be an integrated unit that includes various components such as a radio, streaming audio solutions, and USB access ports for digital audio devices, with elements such as a navigation system that provides navigation instructions to a driver of the car and/or to the car wash system computer 108. In an example implementation, the infotainment system 210 has a display 211 that includes a graphical user interface (GUI) for use by an occupant of the vehicle 105. The GUI may be used for various purposes such as to make a request to provide information about the car wash 120 and/or to make a reservation for use of the car wash 120. The display 211 may also be employed for displaying various types of alerts and messages associated with washing the vehicle 105.

The car wash system computer 108 may include a processor 220 and a memory 230. The memory 230, which is one example of a non-transitory computer-readable medium, may be used to store an operating system (OS) 250 and various code modules such as, for example, a car wash system module 240 and a sensor data processing module 245. The code modules are provided in the form of computer-executable instructions that can be executed by the processor 220 for performing various operations in accordance with the disclosure.

The car wash system module 240 may be executed by the processor 220 for performing various operations such as, for example, evaluating information provided by the dirt detection system 107. The information may be evaluated in cooperation with the sensor data processing module 245 for determining whether the amount of dirt present on the vehicle 105 exceeds a threshold value. When the amount of dirt exceeds the threshold value, a remedial action directed at having the vehicle 105 washed may be executed.

Figure 3:
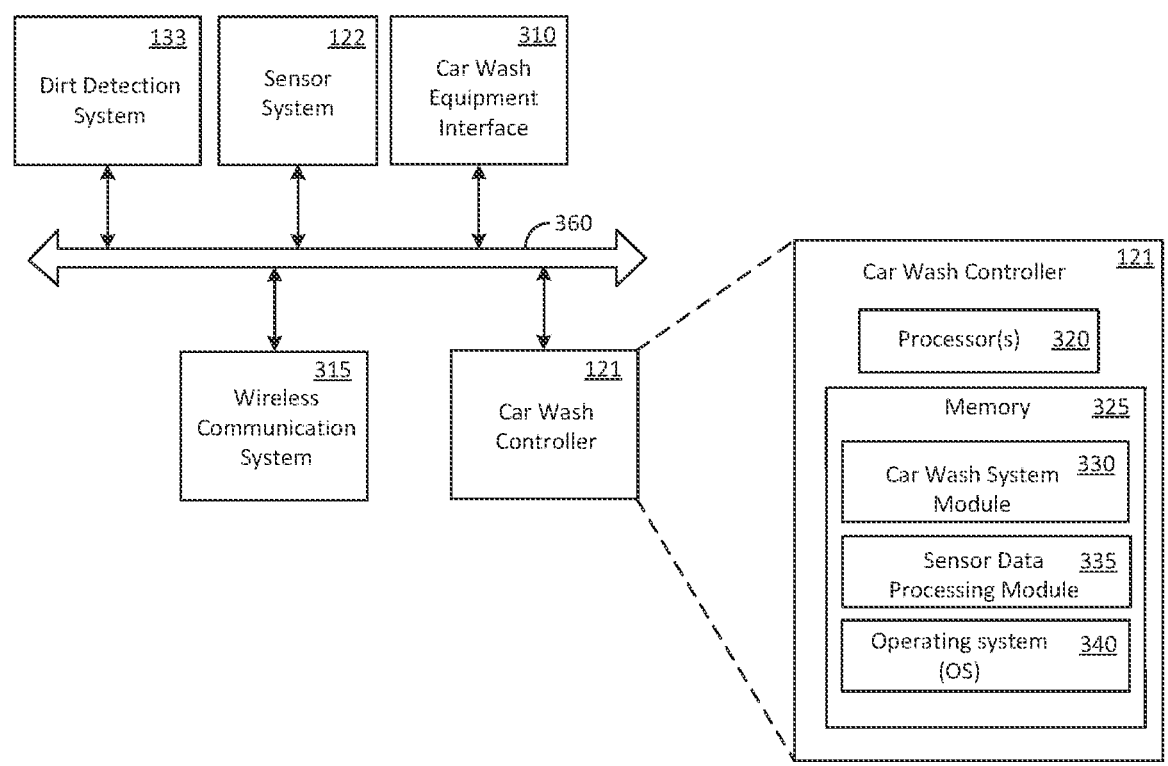
FIG. 3 shows some example components that may be included in a car wash in accordance with the disclosure.

FIG. 3 shows some example components that may be included in the car wash 120 in accordance with the disclosure. In this example configuration, the car wash 120 may contain a dirt detection system 133, the car wash controller 121, the sensor system 122, a wireless communication system 315, and car wash equipment interface 310 that may be communicatively coupled to each other via a bus 360.

The bus 360 can be implemented using one or more of various wired and/or wireless technologies. For example, the bus 360 can include a wired bus portion incorporating communication technologies such as, for example, Ethernet or Fiber Distributed Data Interface (FDDI) and/or a wireless bus portion incorporating communication technologies such as, for example, Bluetooth®, ZigBee®, or near-field-communications (NFC), cellular, Wi-Fi, Wi-Fi direct, machine-to-machine communication, and/or man-to-machine communication to accommodate communications between the car wash controller 121 and one or more devices coupled to the bus 360.

The bidirectional links between the various elements can carry commands in one direction (such as, for example, a "fetch information" command issued by the car wash controller 121 to the dirt detection system 133) and can carry information in an opposite direction (such as, for example, images and/or information from the dirt detection system 133 to the car wash controller 121).

The dirt detection system 133 may include various types of components based on the nature of the detection process. For example, in one implementation, the dirt detection system 133 may include one or more cameras that capture images of various exterior surface areas of the vehicle 105 when the vehicle 105 enters the car wash 120. The images may be conveyed to the car wash controller 121 for evaluating. In another implementation, the dirt detection system 133 may be configured to evaluate water samples to determine an amount of dirt that is being washed off the vehicle 105 when water is squirted on various surfaces of the vehicle 105. For example, a small quantity of water may be squirted by the nozzle 124 on a driver side surface of the vehicle 105. The water runoff as a result of the squirt may be analyzed by the dirt detection system 133 in order to determine an amount of dirt present on the driver side surface of the vehicle 105. Other nozzles may be similarly used to determine amounts of dirt on various other surfaces of the vehicle 105. The water sample evaluation may be combined with information obtained from images captured by one or more camera(s) in one example implementation in accordance with the disclosure.

The sensor system 122 may include various types of sensors for performing various types of functions. A few examples of such sensors may include cameras, infrared sensors, radar sensors, and ultrasonic sensors. One or more of these sensors may be arranged to provide information to the car wash controller 121 that the vehicle 105 has entered a bay of the car wash 120.

The wireless communication system 215 may include elements such as wireless transmitters and receivers that enable communicative coupling between the car wash controller 121 and the network 150 to enable the car wash controller 121 to communicate with the car wash system computer 108 in the vehicle 105, for example.

The car wash equipment interface 310 may be accessed by the car wash controller 121 to provide commands to be executed by the car wash equipment (roller brushes, nozzles, etc.) in the car wash 120.

The car wash controller 121 may include a processor 320 and a memory 325. The memory 325, which is another example of a non-transitory computer-readable medium, may be used to store an operating system (OS) 340 and various code modules such as, for example, a car wash system module 330 and a sensor data processing module 335. The code modules are provided in the form of computer-executable instructions that can be executed by the processor 320 for performing various operations in accordance with the disclosure.

Figure 4:
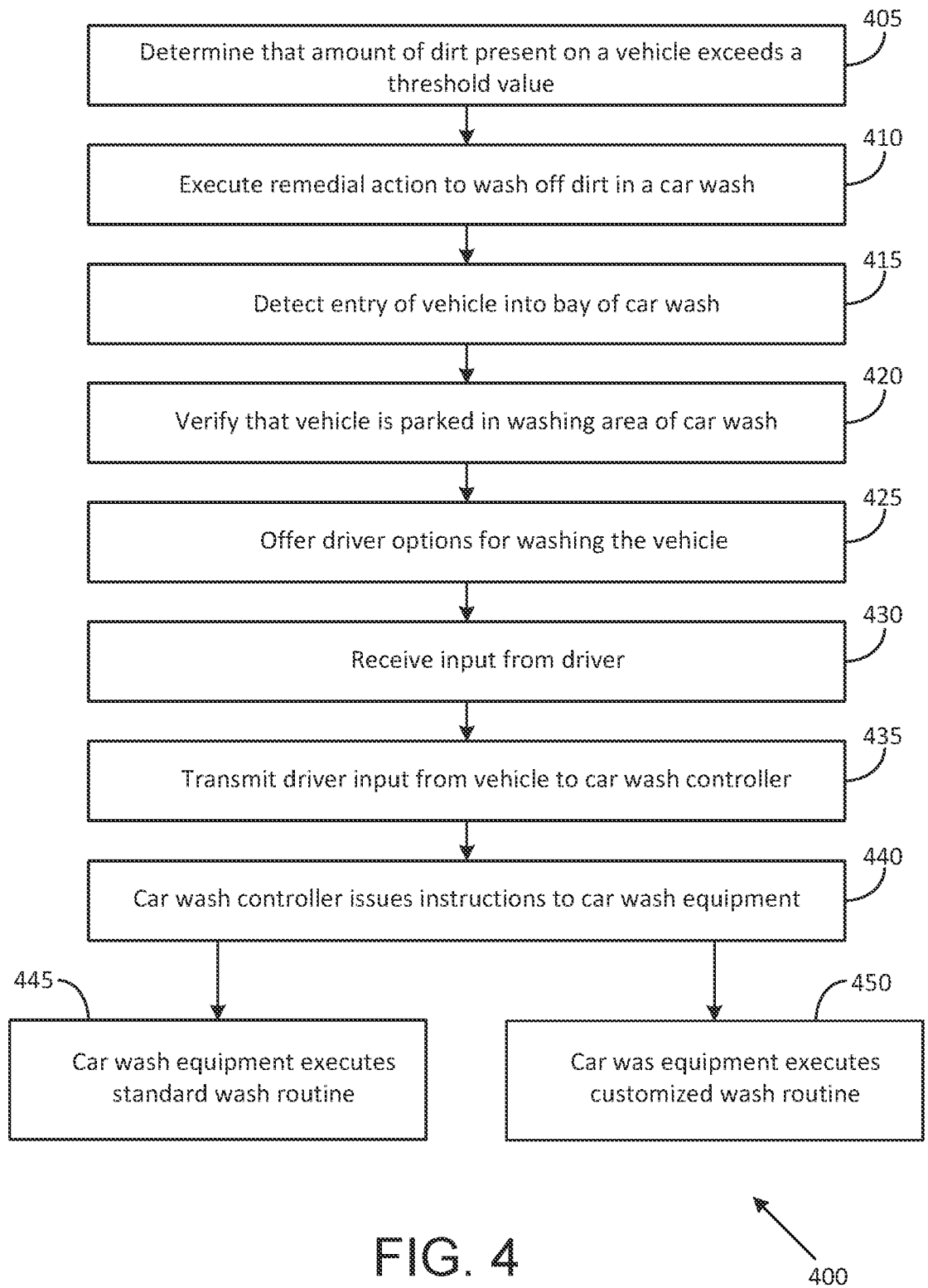
FIG. 4 shows a flowchart of an example method to wash a vehicle in a car wash in accordance with an embodiment of the disclosure.

The car wash system module 330 may be executed by the processor 320 for performing various operations such as, for example, operations described below in the form of a flowchart that is illustrated in FIG. 4. The sensor data processing module 335 may be executed to evaluate information provided to the car wash controller 121 by the dirt detection system 133.

FIG. 4 shows a flowchart 400 of an example method to wash the vehicle 105 in the car wash 120 in accordance with an embodiment of the disclosure. The flowchart 400 illustrates an exemplary sequence of operations that can be implemented in hardware, software, or a combination thereof. In the context of software, the operations represent computer-executable instructions stored on one or more non-transitory computer-readable media such as the memory 230 and the memory 325, that, when executed by one or more processors such as the processor 220 and the processor 320, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 400 may be executed by the car wash system module 240 and/or by the car wash system module 330, individually and/or in cooperation with each other. The operations indicated in the flowchart 400 have been described below by using the system 100 shown in FIG. 1. However, it must be understood that the flowchart 400 is equally applicable to various other embodiments in accordance with the disclosure.

At block 405, the dirt detection system 107 in the vehicle 105 may detect an amount of dirt present on the vehicle 105. In one example case, the surface area over which the dirt is detected by the dirt detection system 107 may extend over an entire external surface of the vehicle 105. In another example case, the surface area over which the dirt is detected by the dirt detection system 107 may be limited to certain parts of the external surface of the vehicle 105, such as, for example, a front portion of the vehicle 105, a rear portion of the vehicle 105, a side portion of the vehicle 105, a roof of the vehicle 105, or an underbody of the vehicle 105.

The car wash system module 240 in the car wash system computer 108 of the vehicle 105 may evaluate the information provided by the dirt detection system 107 and determine that the amount of dirt present on the vehicle 105 exceeds a threshold value.

At block 410, the car wash system module 240 executes a remedial action directed at having the vehicle 105 washed in order to remove dirt present on the vehicle 105. In one example scenario, the remedial action can involve issuing an alert to the driver of the vehicle 105. The alert may be issued through the infotainment system 210, for example in the form of a message displayed on the display 211 of the infotainment system 210. The alert and/or message may direct the driver of the vehicle 105 to travel to a car wash to have the vehicle 105 washed. In another example scenario, where the vehicle 105 is an autonomous vehicle, the remedial action may involve the car wash system computer 108 cooperating with the vehicle computer 106 to autonomously drive the vehicle 105 to the car wash (for example, the car wash 120).

At block 415, an object entry sensor of the sensor system 122 in the car wash 120 detects an entry of the vehicle 105 into a bay of the car wash 120.

At block 420, a proximity sensor of the sensor system 122 in the car wash 120 verifies that the vehicle 105 is parked in a wash area of the car wash 120 where the various roller brushes can make contact with the vehicle 105. The sensor system 122 may provide a signal to the car wash controller 121 upon ensuring that the vehicle 105 is parked satisfactorily in the wash area. The car wash controller 121 may receive the signal and initiate an interactive communication session with the car wash system computer 108 in the vehicle 105.

At block 425, and as a part of the interactive communication session, the car wash controller 121 may cooperate with the car wash system computer 108 to offer the driver of the vehicle 105 various options for washing the vehicle 105.

At block 430, the driver of the vehicle 105 may respond to queries posed by the car wash system computer 108 by providing input such as, for example, a preferred choice of detergent (an eco-friendly detergent, for example) to be dispensed by the car wash equipment, an amount of water to be dispensed by the car wash equipment (an eco-friendly amount, for example), and/or portions of the vehicle 105 that require additional attention by the car wash equipment. The car wash controller 121 may also provide an indication to the driver as to the amount of dirt present on various parts of the vehicle 105 and provide an option for the driver to indicate a nature of the wash to be performed upon the vehicle 105, such as, for example, "wash the grille and the windshield and not the rest of the car," "apply a rubber cleaning compound to the sidewalls of the tires," "execute a detailing wash routine upon the wheels," "apply a wax solution exclusively upon painted areas of the vehicle," etc. etc.

At block 435, the options and instructions provided by the driver may be conveyed to the car wash controller 121 as a part of the interactive communication session. In some scenarios, the car wash system computer 108 may provide input to the car wash controller 121 pertaining to washing the vehicle 105. For example, the car wash system computer 108 may estimate an amount of water that may be needed to wash away the amount of dirt that was detected by the dirt detection system 107 and convey this information to the car wash controller 121. The car wash controller 121 may use such information provided by the car wash system computer 108 to execute the car wash.

At block 440, the car wash controller 121 may issue instructions to the car wash equipment (via the car wash equipment interface 310). The instructions may be based on input provided by the driver and/or by the car wash system computer 108. The car wash controller 121 may issue a default set of instructions if the driver has no preferences.

At block 445, the car wash equipment may execute a standard wash routine when the driver has no preferences. The standard wash routine can be a default routine that involves washing the vehicle 105 in its entirety using a default wash sequence. In some cases, the driver may be provided an opportunity to select one of several default wash sequences.

At block 450, the car wash equipment may execute a customized wash routine that is tailored to suit one or more preferences provided by the driver of the vehicle 105. For example, in one example scenario, the car wash equipment may employ a first set of roller brushes and a first set of nozzles to wash off dirt on a specific part of the vehicle 105 and then employ a second set of roller brushes and a second set of nozzles to wash the entire vehicle. The first set of nozzles can be a subset of the second set of nozzles. For example, the first set of nozzles may include the nozzle 126 and the nozzle 127 that direct water upon the wheels of the vehicle 105, whereas the second set of nozzles additionally include the nozzle 123 and the nozzle 124. The customized wash routine may include a feedback procedure where one or more sensors of the sensor system 122 (one or more cameras, for example) may be used by the car wash controller 121 to inspect various exterior surfaces of the vehicle 105 and to repeat a washing procedure upon surface areas that may not have been washed adequately. Residual dirt on these surface areas may be evaluated by the car wash controller 121 in cooperation with the dirt detection system 133.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 230 or the memory 325, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, at a preselected time by a first camera of a first dirt detection system in a vehicle, an amount of dirt present on a first portion of the vehicle, wherein the preselected time is determined by an owner of the vehicle and corresponds to a time when the vehicle is parked, and wherein the first camera is attached to the vehicle;
   causing the vehicle to communicate with a car wash controller of a car wash via a network in order to place a reservation for the vehicle at the car wash;
   causing the vehicle to autonomously drive to the car wash;
   selecting, by the car wash controller, a first piece of equipment in the car wash to wash the first portion of the vehicle, the selecting based on the amount of dirt present on the first portion of the vehicle;
   communicating, by a car wash system computer in the vehicle, to the car wash controller of the car wash, an instruction that specifies an amount of water to be used for washing the vehicle;
   operating, by the car wash controller, the first piece of equipment to wash the first portion of the vehicle;
   evaluating water samples with a second dirt detection system of the car wash while the vehicle is being washed by analyzing water runoff as a result of a quantity of water squirted onto the first portion of the vehicle in order to determine how much dirt is being washed off of the first portion of the vehicle;
   capturing second images of the vehicle while the vehicle is inside the bay of the car wash with a second camera of the car wash, and wherein the car wash controller uses said second images to determine whether or not to perform another washing of the first portion.

2. The method of claim 1, wherein the first portion of the vehicle is one of a roof of the vehicle or an underbody of the vehicle.

3. The method of claim 1, wherein the first piece of equipment comprises a set of nozzles.

4. The method of claim 1, further comprising:
   determining an amount of detergent to be dispensed by the first piece of equipment in the car wash based on the amount of dirt present on the first portion of the vehicle.

5. A method comprising:
   detecting, at a preselected time by a first camera of a first dirt detection system of a vehicle, an amount of dirt present on the vehicle, wherein the preselected time is determined by an owner of the vehicle and corresponds to a time when the vehicle is parked, and wherein the first camera is attached to the vehicle;
   determining, by a car wash system computer in the vehicle, that the amount of dirt present on the vehicle exceeds a threshold value;
   causing the car wash system computer to communicate with a car wash controller of a car wash via a network in order to place a reservation for the vehicle at the car wash;
   causing the vehicle to autonomously drive to the car wash;
   selecting, by the car wash controller, a first piece of equipment in the car wash to wash the vehicle, the selecting based on the amount of dirt present on the vehicle;
   communicating, by the car wash system computer in the vehicle, to the car wash controller of the car wash, an instruction that specifies an amount of water to be used for washing the vehicle;
   evaluating water samples with a second dirt detection system of the car wash while the vehicle is being washed by analyzing water runoff as a result of a quantity of water being squirted onto the vehicle in order to determine how much dirt is being washed off of the vehicle;
   capturing second images of the vehicle while the vehicle is inside the bay of the car wash with a second camera of the car wash;
   conveying the second images to the car wash controller for evaluation, and wherein the car wash controller uses said second images to determine whether or not to perform another washing of the vehicle.

6. The method of claim 5, wherein the first piece of equipment comprises a set of nozzles.

7. The method of claim 1, wherein the first dirt detection system comprises a photodiode sensor mounted to a reflective surface of the vehicle, and a photodiode transmitter disposed on the reflective exterior surface in order to direct light outwards through a transparent layer of the vehicle, wherein the transparent layer is disposed on the reflective surface.

* * * * *